Aug. 30, 1932.  W. T. COMER  1,874,453
PROCESS AND APPARATUS FOR PRODUCING FROZEN CONFECTIONS
Filed Oct. 6, 1930
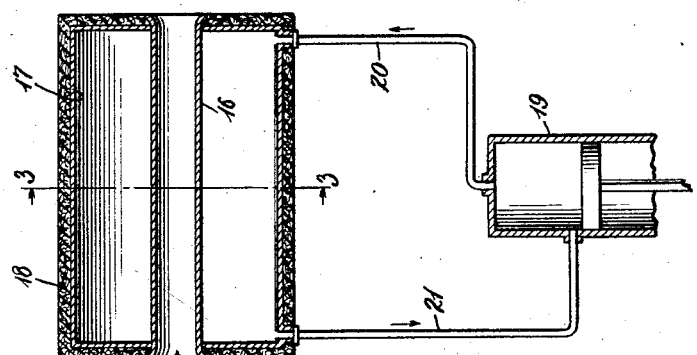
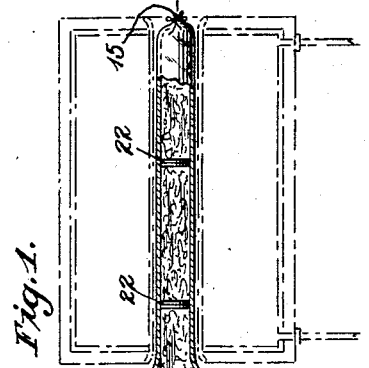
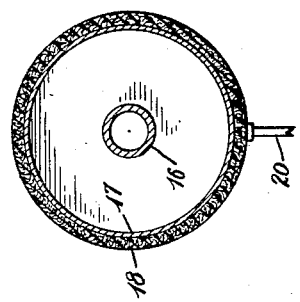
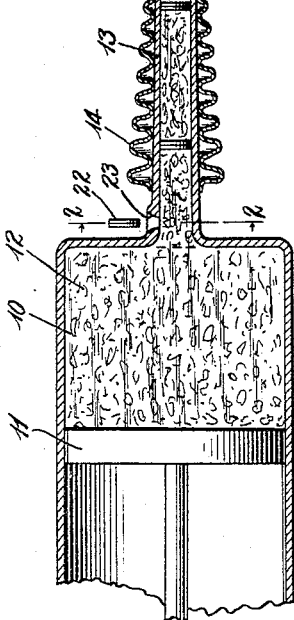
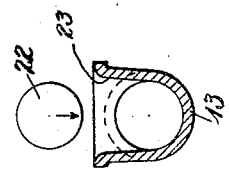
Inventor
William T. Comer
By Browne & Phelps
Attorneys Patented Aug. 30, 1932

1,874,453

UNITED STATES PATENT OFFICE

WILLIAM T. COMER, OF ATLANTA, GEORGIA, ASSIGNOR TO CRYSTAL CARBONIC LABORATORY, OF ATLANTA, GEORGIA, A CORPORATION OF GEORGIA

PROCESS AND APPARATUS FOR PRODUCING FROZEN CONFECTIONS

Application filed October 6, 1930. Serial No. 486,792.

The invention relates to frozen confections and has as an object the provision of a process of producing frozen confections by a continuous method whereby they may be produced cheaply and rapidly.

It is a further object of the invention to provide a process of producing frozen confections in the form of fingers or pencils of confection which may or may not be enclosed in a casing as produced.

It is a further object of the invention to provide a novel form of frozen confection enclosed in a casing whereby the confection may be consumed out of hand without contact of the fingers with the edible portion of the confection.

It is a further object of the invention to provide an apparatus for carrying out the process of the invention.

Further objects of the invention will appear from the following description when read in connection with the accompanying drawing showing an illustrative embodiment of the invention, and wherein:—

Fig. 1 is a central vertical section of the apparatus for carrying out the process showing in dotted lines a position into which the freezing apparatus may be moved; and Figs. 2 and 3 are transverse sections respectively on lines 2—2 and 3—3 of Fig. 1.

In accordance with the invention a frozen confection may be produced in the form of frozen fruit pulp, ice cream, or ices, which material may if desired be enclosed in a casing for sanitary protection whereby it may be conveniently eaten out of hand.

To carry out the process of the invention the apparatus illustrated is shown as comprising an extruding device in the form of a cylinder 10 having a piston 11 reciprocable therein by means of which the material to be frozen indicated at 12 may be caused to extrude from a nozzle as 13.

If a casing is to be supplied over the frozen confection, a normally flexible tube 14 of material as transparent glassine or any of the usual casings which are provided for stuffing with frankfurt sausages may be gathered upon the nozzle 13 and the end thereof tied as indicated at 15, whereupon extrusion of the material 12 from the nozzle will carry the filled casing off from the nozzle.

To freeze the material as extruded, there is shown an open-ended cylinder 16 surrounded by a freezing chamber 17 closed at its ends and preferably provided with heat insulation material 18.

To intensely chill the walls of the tube 16, there is shown diagrammatically a carbon dioxide compressor 19 having its output connected by means of pipe 20 with the interior of the chamber 17 and having its intake also connected by means of a pipe 21 with the interior of the chamber. The compressor 19 desirably compresses the carbon dioxide to liquefaction and the expansion of the same in the chamber 17 produces carbon dioxide snow which evaporating in the chamber cools the tube 16 so intensity as to substantially instantaneously freeze the confection as it passes through the tube 16.

The chamber 17 is shown as placed in spaced relation to the nozzle 13 for purpose of placement of the casing 14 on the nozzle 13. After such placing the chamber 17 may be moved to a position closely adjacent the end of the nozzle 13 into the position shown in dotted lines so that the freezing will take place immediately as the material leaves the nozzle. By a reasonably deliberate extrusion, the material will be frozen as fast as extruded and will be projected from the tube 16 in frozen condition where sections of the tubing may be broken or cut off for use.

In order to separate the material into readily removable sections, provision is made for introducing spacing discs 22 into the stream of extruded material. To this end a slot 23 is shown in the upper portion of the nozzle 13 into which discs preferably in superposed pairs may be inserted at desired intervals to be carried along with the stream of extruded material.

After the material is frozen the casing 14 may then be severed between the discs of each pair thus providing a finger or pencil of frozen confection enclosed in a casing closed at each end by means of an inserted disc. The casing 14 may then be stripped off as required by consumption or if the casing 14 is made of edible material it may be eaten with the confection.

In accordance with one use of the process, peach pulp has been frozen providing a delicious frozen confection.

Minor changes may be made in the physical embodiment of the invention or in the steps of the process within the scope of the appended claims without departing from the spirit of the invention.

I claim:

1. The process of producing a frozen confection which comprises extruding confection material, introducing separating discs into the stream of extrusion and freezing the material as fast as extruded.

2. The process of producing a frozen confection which comprises extruding confection material into a tubular casing, introducing separating discs into the stream of extrusion to be therewith introduced into the casing, freezing the material as fast as extruded and separating the frozen material and casing into sections adjacent the discs.

3. The process of producing a frozen confection which comprises extruding confection material into a tubular casing, introducing pairs of superposed separating discs into the stream of extrusion to be therewith introduced into the casing, freezing the material as fast as extruded and separating the frozen material and casing between the discs of each pair into sections closed at each end by one of said discs.

4. Apparatus for producing a frozen confection comprising, in combination, extrusion means, means for introduction of separating discs into a stream of material extruded thereby and means adjacent the point of emission to freeze the material as it passes from the extrusion means.

WILLIAM T. COMER.